United States Patent [19]

Dillman et al.

[11] 3,757,258

[45] Sept. 4, 1973

[54] HIGH FREQUENCY FILTER APPARATUS

[75] Inventors: Richard F. Dillman, Lexington; James L. Larsen, Needham Heights; Richard N. Tverdoch, Waltham, all of Mass.

[73] Assignee: Hewlett Packard Company, Palo Alto, Calif.

[22] Filed: Dec. 23, 1971

[21] Appl. No.: 211,483

[52] U.S. Cl. .................................... 333/73, 333/76
[51] Int. Cl. .......................... H03h 7/10, H03h 7/00
[58] Field of Search ........................... 333/72, 73, 76

[56] References Cited

UNITED STATES PATENTS

| | | | |
|---|---|---|---|
| 2,196,272 | 4/1940 | Peterson | 333/73 R |
| 2,270,416 | 1/1942 | Cork et al. | 333/73 |
| 2,644,927 | 7/1953 | Dishal et al. | 333/73 X |
| 2,238,438 | 4/1941 | Alford | 333/73 X |
| 2,779,924 | 1/1957 | Chatellier | 333/73 X |
| 3,530,405 | 9/1970 | Luzzatto | 333/73 R |
| 2,946,847 | 7/1960 | Callender | 333/73 R |
| 2,967,930 | 1/1961 | Anderson | 333/73 X |

*Primary Examiner*—Rudolph V. Rolinec
*Assistant Examiner*—Saxfield Chatmon, Jr.
*Attorney*—A. C. Smith

[57] ABSTRACT

An improved image-frequency rejection filter combines series resonant band-reject filtering at the image frequency with parallel resonant bandpass filtering at the carrier frequency.

3 Claims, 5 Drawing Figures

PATENTED SEP 4 1973 3,757,258

HIGH FREQUENCY FILTER APPARATUS

RELATED CASE

An improved electrocardiac monitoring telemetry system including a battery-operated transmitter adapted to be carried by an ambulatory patient is disclosed in pending U. S. Pat. application Ser. No. 207,859, filed on Dec. 14, 1971, and assigned to the same assignee as the present invention.

BACKGROUND OF THE INVENTION

In a conventional super heterodyne receiver, the frequency which is one intermediate frequency away from the local oscillator frequency on the side away from the carrier frequency is called the image frequency. This signal, if presented to the mixer along with the local oscillator, will also create the intermediate frequency. If the receiver is to be insensitive to interfering signals presented on the image frequency, the image frequency must be filtered out in the preceding radio frequency (RF) stages. Because the image frequency is usually fairly close to the carrier frequency, and because the attenuation required is often very large, the image filter design is usually critical. Generally, image frequency rejection is accomplished by means of a bandpass filter. In order to provide adequate rejection, several stages of filtering are required. Each filter has insertion loss which generally increases as the sharpness of the filter increases. At frequencies up to 200 MHz, inductance-capacitance (LC) filters are traditionally used. At frequencies over 1,000 MHz, tuned cavity filters are traditionally used. The region in between creates problems that are usually solved by a combination of techniques. Cavities become large, and LC filters are not narrow enough.

SUMMARY OF THE INVENTION

The present invention is a transmission line filter which combines a series resonant band reject filter at the image frequency with a parallel resonant bandpass filter at the carrier frequency.

DESCRIPTION OF THE DRAWINGS

Referring now to FIG. 1, there is shown a transmission line 9 which is tuned by capacitor 11 so that at the image frequency (say, 423 MHz) the line is series resonant and presents a very low impedance. This effectively shorts out the signal at the image frequency.

Figure 1:
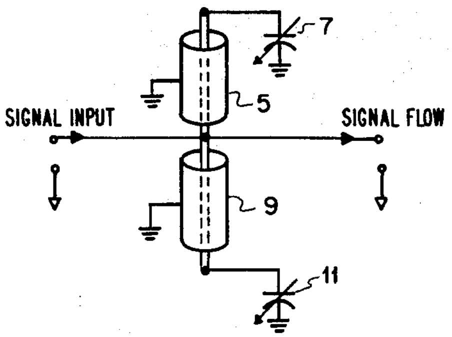
FIG. 1 is a pictorial schematic diagram of the filter of the present invention.
Figure 2:
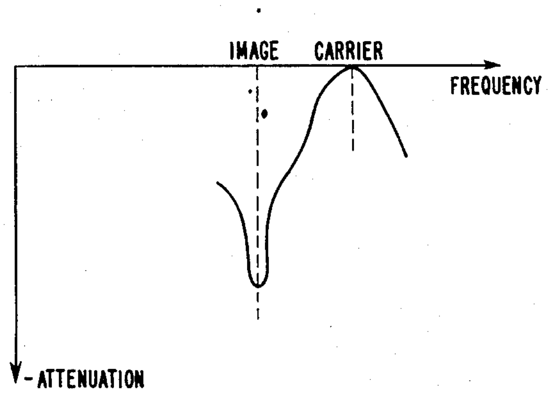
FIG. 2 is a graph showing the frequency response of the filter of FIG. 1.

At the carrier frequency (say, 467 MHz) the impedance of line 9 is no longer a short circuit but instead looks like a net inductance. The transmission line 5 which is tuned by capacitor 7 at the carrier frequency forms a net capacitance which, with the inductance of the line 9, forms a parallel resonant circuit. This permits maximum signal transmission at the carrier frequency. A plot of the frequency response is shown in FIG. 2. With this arrangement, a very high amount of rejection can be obtained at the image frequency with very little loss at the carrier frequency. Filters as described above are typically capable of supplying over 50 db of image rejection. In contrast, for an equivalent amount of image rejection with a bandpass filter, several more stages would be required with concomitant higher losses and the conventional bandpass design usually requires some additional decoupling means between the filters to prevent them from loading one another.

Figure 3A:
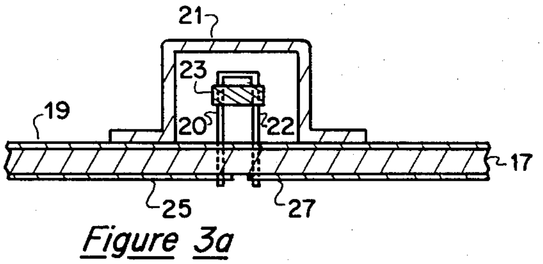
FIGS. 3*a* and *b* are side and front partial sectional views of the filter of the present invention.
Figure 3B:
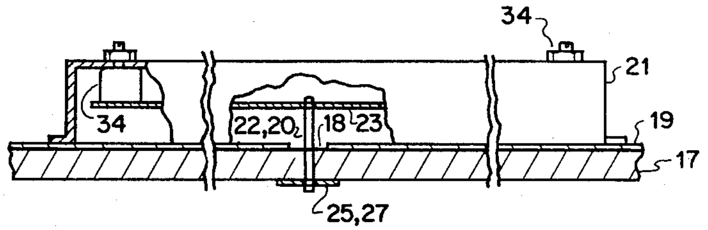

Referring now to FIGS. 3*a* and 3*b*, there are shown side and front partial sectional views, respectively, of the mechanical element which comprise the filter. This mechanical design of the filter is suitable for incorporation with other components on a common fiberglas printed circuit board. The pattern on the printed circuit board 17 consists of ground plane 19 over almost all of the board area. The outer shield 21 is connected to this ground plane and two holes through the board 17 and through the ground plane (which is recessed 18 away from the holes to prevent electrical contact) allow attachment of the signal conductor 23 via two laterally spaced center leads 20, 22 to foil patterns 25, 27 in the signal path on the bottom side of the printed circuit board. In effect, this construction forms a completely shielded air dielectric transmission line using two metal parts and the ground plane on the printed circuit board. Variable capacitors 34 are provided at opposite ends of the signal conductor 23 for turning both ends of the transmission line and also for mounting the signal line to the outer shield 21. It is important to note that the use of two wires 20, 22 connected to laterally spaced opposite sides of the signal conductor 23 (as opposed to a single wire) is preferred for improved electrical performance. It omits an impedance common to input and output and enhances the isolation between the input and the output of the filter. Alternatively, in this embodiment the signal conductor 23 may dip down in the center to contact a signal conductor on the upper surface of the circuit board.

Figure 4:
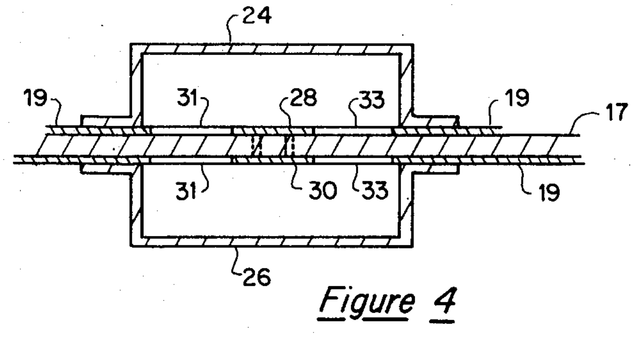
FIG. 4 is a sectional view of another embodiment of the filter of the present invention.

It should be understood that other embodiments of the invention may include filters that are more symmetrically oriented about the circuit board, as shown in FIG. 4. In this illustrated embodiment, the outer shields 24, 26 are disposed in contact with the ground plane conductor 19 on the circuit board 17, which ground plane conductor is eliminated under the shield around the signal conductors 28, 30. The upper and lower outer shields and the upper and lower signal conductors may be respectively connected together and the signal circuits 31, 33 may be connected to laterally spaced sides of the signal conductors 28, 30. In this embodiment, as in other embodiments, the remote ends are connected via adjustable capacitors to the outer shield or ground conductor to permit the adjustment previously described.

We claim:

1. Signal selective apparatus comprising:

a first transmission line having a signal conductor and a reference conductor disposed in electromagnetically coupled relationship and having a characteristic impedance;

a second transmission line having a signal conductor and a reference conductor disposed in electromagnetically coupled relationship and having a characteristic impedance;

a signal port including a first conductor connected to the signal conductor of the first transmission line near one end thereof and including a second conductor connected to the reference conductor of the first transmission line;

means connecting one end of the signal conductor of the second transmission line to the first conductor of the signal port and the reference conductor of the second transmission line to the second conductor of the signal port;

a first reactance element connected between the reference conductor and the signal conductor of the first transmission line near the opposite end thereof, the reactance of the element having a value with respect to the characteristic impedance of the first transmission line to establish series resonance therewith at a first frequency of signal appearing at said signal port; and a second reactance element connected between the reference conductor and the signal conductor of the second transmission line near the other end thereof, the reactance of the second element having a value in combination with the characteristic impedance of the second transmission line which establishes resonance with the combination of the transmission line and first reactance element at a second frequency of signal appearing at said signal port.

2. Signal selective apparatus as in claim 1 wherein:

the second frequency is higher or lower than said first frequency; and said first and second frequencies are within the range from approximately 200 MHz to approximately 1,000 MHz.

3. Signal selective apparatus as in claim 1 comprising a second conductor connected to said signal conductors of the first and second transmission lines adjacent the common connection of said first conductor to the signal conductors of the first and second transmission lines for providing an output conductor which is isolated from reactance of the first conductor of said signal port.

* * * * *